| United States Patent | [15] | 3,670,512 |
|---|---|---|
| Grazier et al. | [45] | June 20, 1972 |

[54] SELF-PROPELLED CABLE BURYING APPARATUS

[72] Inventors: Robert L. Grazier, Wadsworth; Kenneth F. Kudingo, Round Lake Beach, both of Ill.

[73] Assignee: Service Dynamics Inc., Lake Bluff, Ill.

[22] Filed: March 12, 1971

[21] Appl. No.: 123,663

[52] U.S. Cl. ..............................................61/72.6, 172/40
[51] Int. Cl. .........................................E02f 5/02, A01b 3/64
[58] Field of Search ......................61/72.6, 72.5, 72.7, 72.1; 172/40; 37/93

[56] References Cited

UNITED STATES PATENTS

| 3,390,533 | 7/1968 | Gremillion | 61/72.6 |
| 3,497,016 | 2/1970 | Ryan | 172/40 |
| 3,559,414 | 2/1971 | Pike et al. | 61/72.6 |
| 3,575,006 | 4/1971 | Rugroden | 61/72.6 |

*Primary Examiner*—Jacob Shapiro
*Attorney*—Silverman & Cass

[57] ABSTRACT

A cable burying apparatus is mounted to a self-propelled tractor which can be ridden by the operator. The cable burying function is achieved by a blade which oscillates in a vertical plane parallel to the front to rear axis of the tractor. The upper end of the blade is pivoted to the top of a housing and a connecting rod driven by an eccentric is connected between the ends of the blade so that rotation of the shaft which mounts the eccentric will oscillate the bottom end of the blade. The housing also carries the eccentric and the shaft which drives the eccentric. Power for the rotation of the shaft is taken from a prime mover that is used to drive the tractor and is coupled to the eccentric shaft by a belt and pulley system including a pulley which is connected to the eccentric shaft. The entire housing is pivotally mounted to the rear of the tractor and can be swung between positions that raise the blade upward away from the ground and that move the blade down into the ground. This can be done by hydraulic means under the control of the operator without leaving his seat and without regard to whether the tractor is moving or not. The blade may have a chute for leading wire or cable through the chute to the bottom of the blade from the top thereof, or it may have a connection at its bottom end to enable a cable or pipe to be connected thereto to be pulled through the ground. In either case there is a narrow slit trench cut by the oscillation of the blade and the cable or pipe is disposed in the bottom of the trench.

13 Claims, 13 Drawing Figures

PATENTED JUN 20 1972 3,670,512

INVENTOR
ROBERT L. GRAZIER
KENNETH F. KUDINGO
BY Silverway + Cass
ATTORNEYS

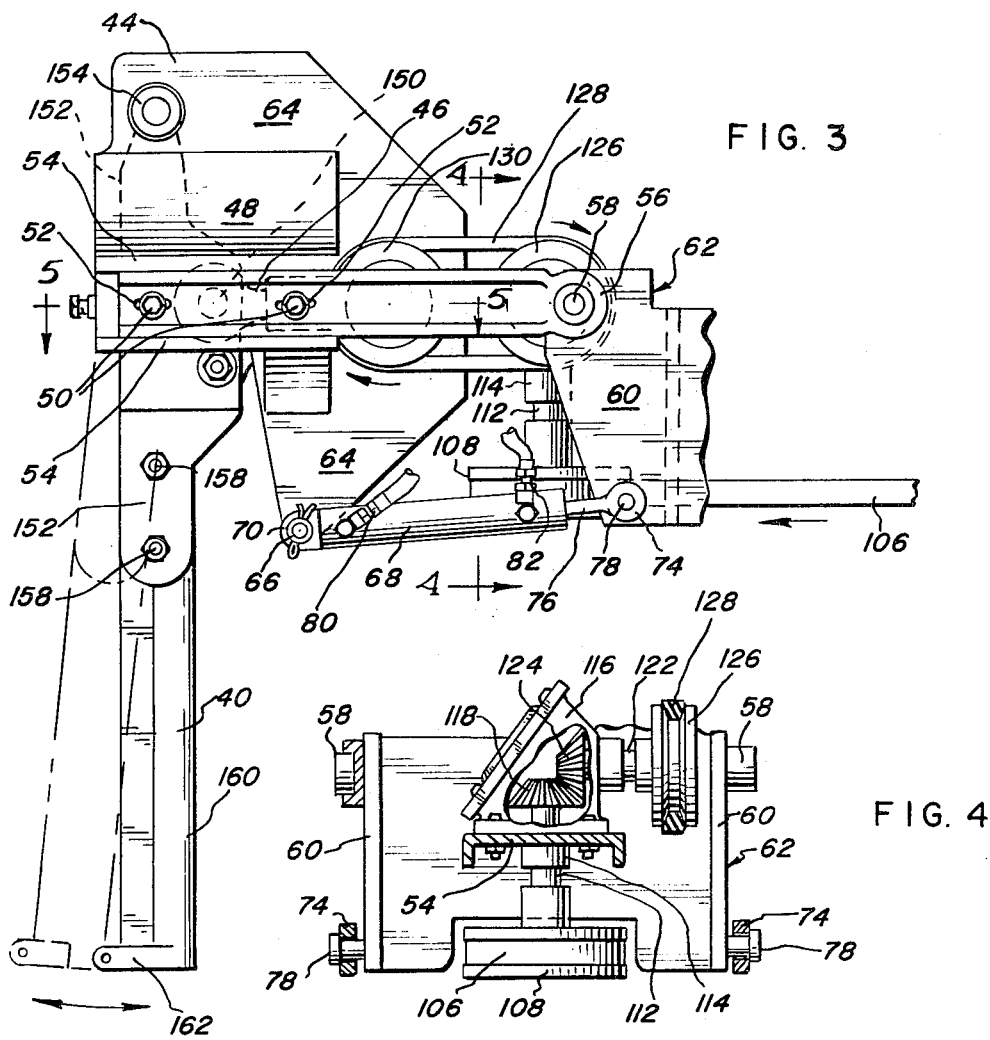
FIG. 3
FIG. 4
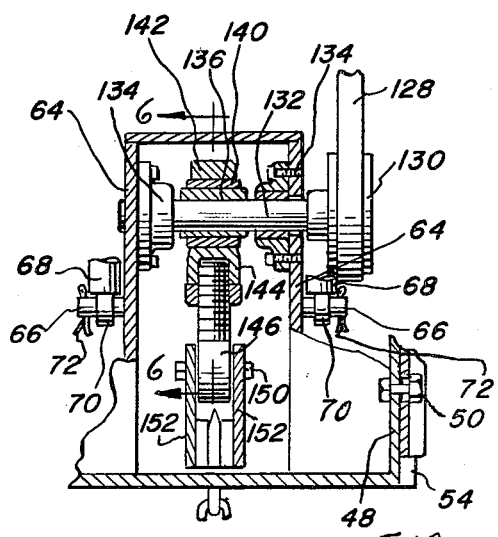
FIG. 5
INVENTOR
ROBERT L. GRAZIER
KENNETH F. KUDINGO
BY Silverman + Cass
ATTORNEYS

INVENTOR
ROBERT L. GRAZIER
KENNETH F. KUDINGO

BY  Silverman & Cass
ATTORNEYS

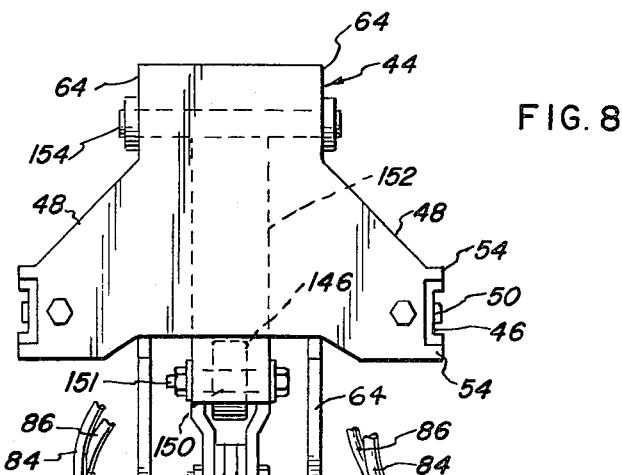
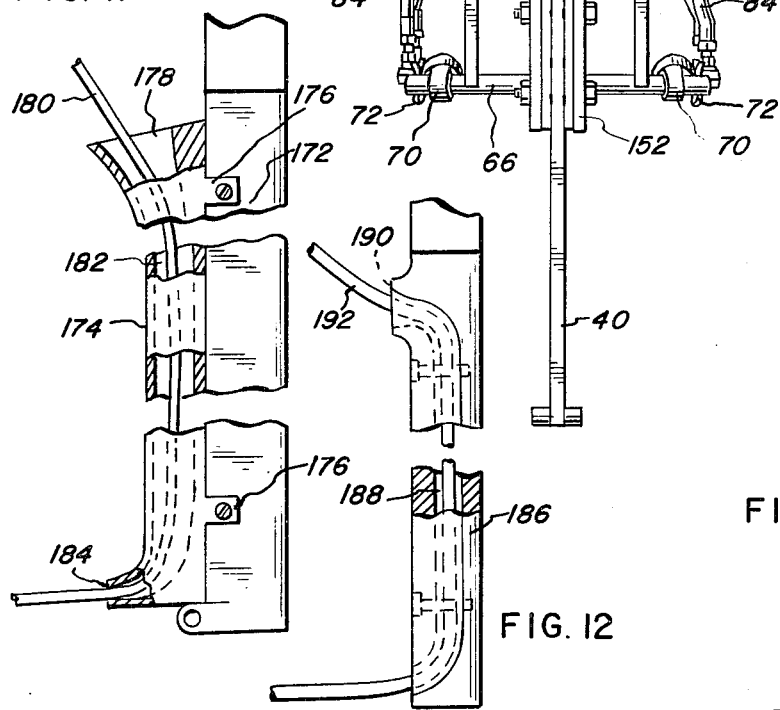
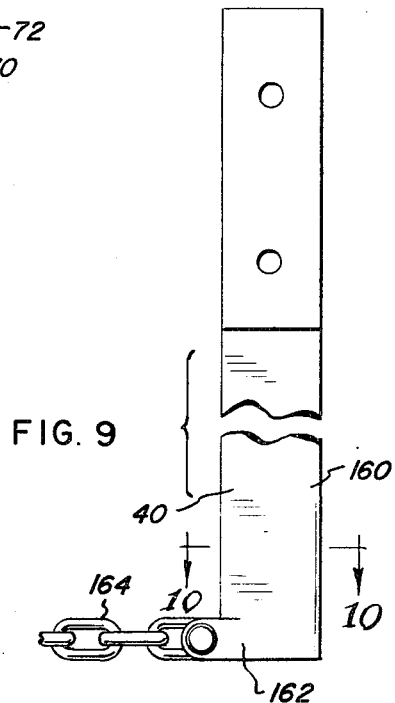
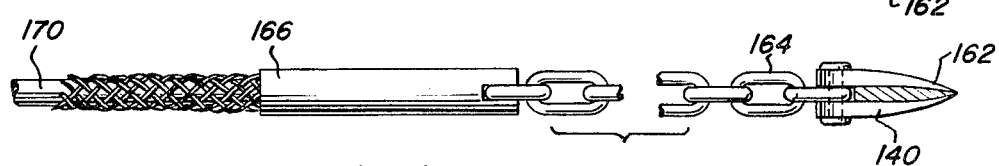

3,670,512

1

SELF-PROPELLED CABLE BURYING APPARATUS

BACKGROUND OF THE INVENTION

The invention herein relates to the art of laying cable or wire in the ground, and is concerned with an apparatus that is self-propelled and can be ridden by the operator while the apparatus is burying the cable.

Prior structures are for the most part complex and utilize substantial power for accomplishing what is done with very little power by the structure of the invention. Self-propelled apparatus which has heretofore been known has required large tractors or road working equipment for accomplishing the burying of cable or pipe. Smaller apparatus has been manually operated and difficult to control because the apparatus has to be guided by a walking operator who is stationed behind the apparatus. The oscillating blade is toward the front of the apparatus and coupled with the fact that the operator must walk behind, this limits the distance from buildings at which point the operator can commence to bury the cable. Prior structures of the manually operated type required the entire machine to be tilted in order to raise the blade from the ground.

The concept of an oscillating blade which is driven from the same prime mover that is used to drive the vehicle is not found in the prior art and hence because separate power units are thus used, the apparatus has tended to be large, cumbersome, complex and expensive.

Mechanisms are known which oscillate blades but these are also complex.

The attributes of simplicity, compactness and effectiveness are combined in the invention to produce a structure which is easy to operate and economical to produce, and which will not unnecessarily tear up the ground or injure turf. Specifically, since the apparatus is combined with a small rubber-tired tractor of the gardening variety, the movement of the tractor itself over the ground does not dig into the turf or destroy greenery. Since the tractor is driven by the operator and steered as conventional vehicles, it is simple to maneuver around objects while laying the cable or wire. Since the blade is a thin oscillating blade, it cuts its way through the ground, making a fine slit trench without the need for a coulter wheel, and does not throw up ridges or mounds as it operates.

SUMMARY OF THE INVENTION

According to the invention, a self-propelled vehicle has a housing pivotally mounted to its rear, the housing being swingable in a vertical direction by hydraulic means controlled by the operator who rides the vehicle. The housing carries an oscillating blade, an eccentric mechanism for oscillating the blade and means for coupling the eccentric mechanism to the prime mover which is used to drive the vehicle. The coupling is such that the swinging movement of the housing upward or downward in positioning the blade does not affect the driving connection between the prime mover of the vehicle and the oscillating blade so that such up and down swinging movement can be accomplished while the vehicle is moving under the complete control of the operator. The driving power is taken from the front end of the vehicle from the prime mover and is transmitted to the rear of the vehicle to a vertical oriented shaft which in turn drives a horizontally oriented shaft. This latter shaft has a sheave which is connected by belt to a shaft that rotates the eccentric mechanism. The axis of the shaft that rotates the eccentric mechanism, which is in the housing, and the pivotal axis of the housing are substantially co-axial to enable the swinging movement of the housing independently of the driving of the blade.

BRIEF DESCRIPTION OF THE DRAWINGS

FIG. 3 is an enlarged side elevational view of the mechanism for raising and lowering the blade;

FIG. 4 is a fragmentary sectional view taken generally along the line 4—4 of FIG. 3 and in the indicated direction;

FIG. 5 is a sectional view taken generally along the line 5—5 of FIG. 3 and in the indicated direction;

FIG. 8 is a rear elevational view of the housing for the blade drive mechanism;

FIG. 9 is a detailed side elevational view of one form of blade for use with the apparatus for burying cable;

FIG. 10 is a sectional view taken generally along the line 10—10 of FIG. 9 and in the indicated direction;

FIG. 11 is a fragmentary side elevational view of a modified form of blade for use with the apparatus; and FIG. 12 is a fragmentary side elevational view of still another modified form of blade.

DESCRIPTION OF THE PREFERRED EMBODIMENT

Figure 1:
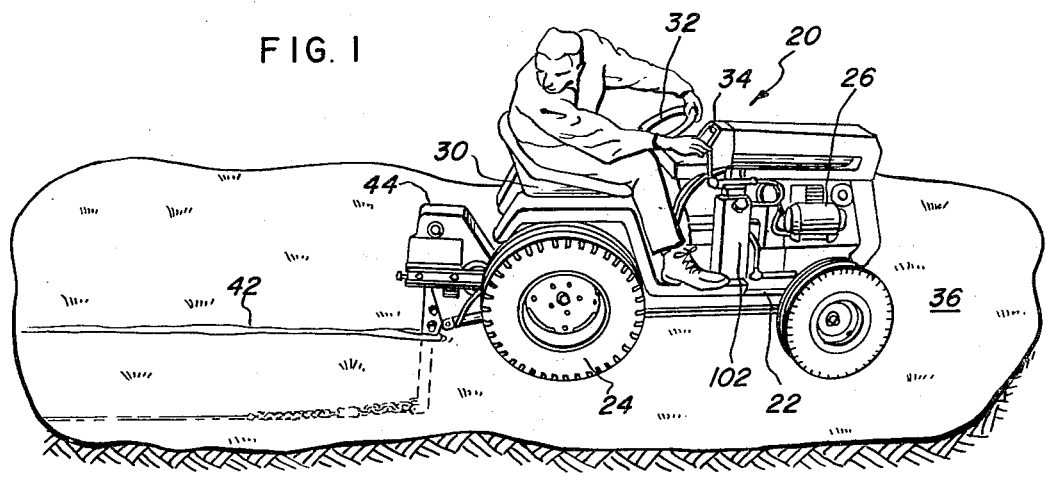
FIG. 1 is a perspective view showing the apparatus of the invention in use burying a cable.

The reference character 20 designates generally a small self-powered tractor of a type readily available on the market and easily modified to comprise a cable-burying apparatus constructed and functioning in accordance with the invention. Such tractors normally have power take-offs driven by the prime mover of the tractor, either in the front of the tractor or in the back thereof, and often at both places. For example, in the tractors used with the invention, the front power take-off was utilized for a completely different purpose than the rear power take-off. This was done without in any way interfering with the structures that were added to the tractor, and increased the versatility of the equipment.

Figure 2:
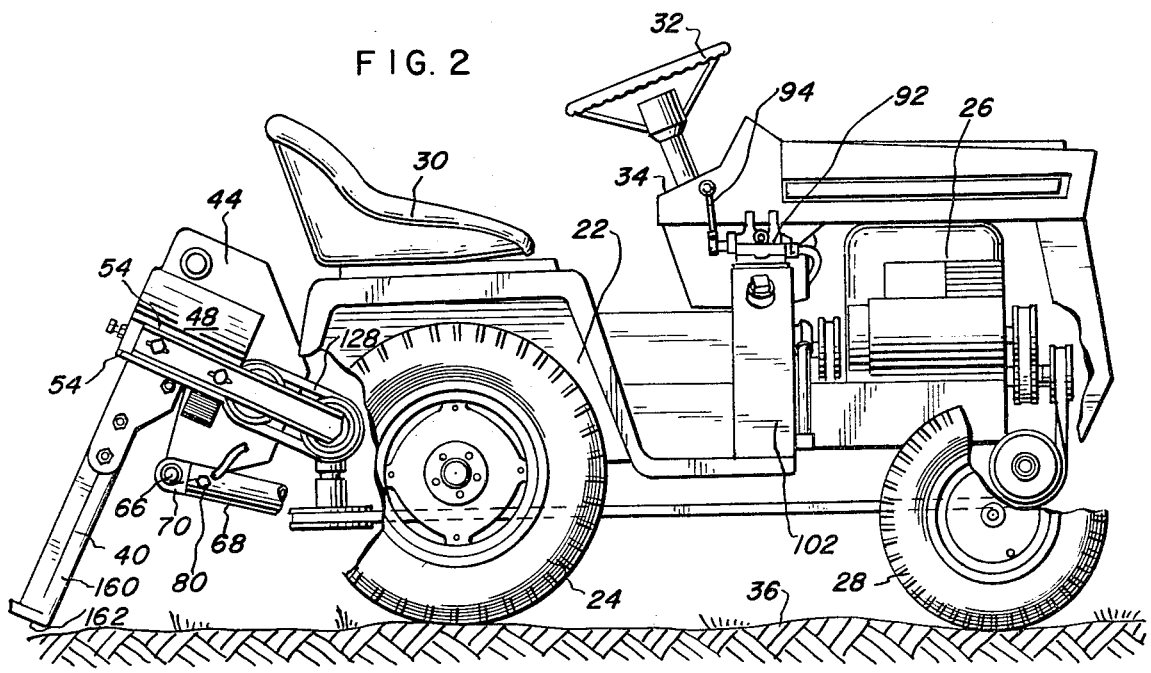
FIG. 2 is a side elevational view of the apparatus with the vibrating blade withdrawn from the ground.
Figure 2A:
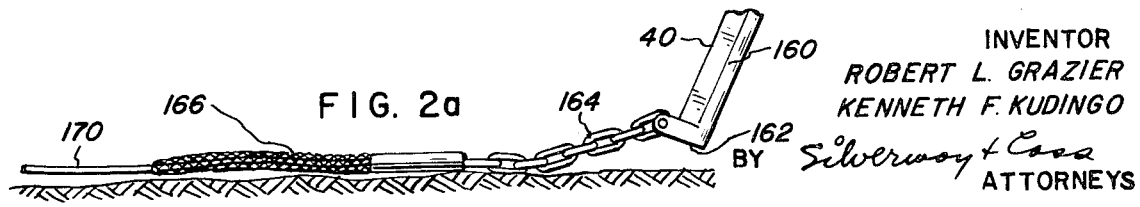
FIG. 2a is a fragmentary side elevational view showing the vibrating blade removed from the ground and with a cable secured thereto for burying, the view being a continuation of the view of FIG. 2.
Figure 6:
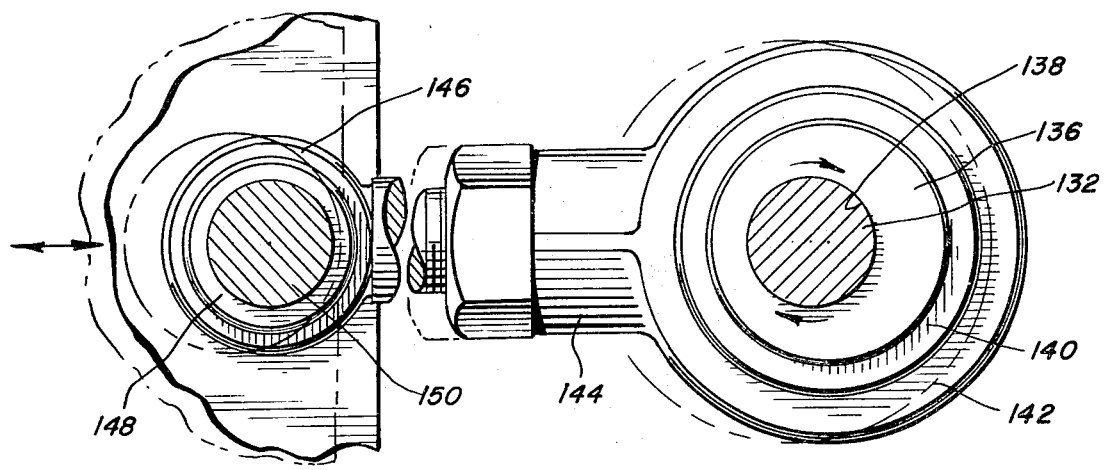
FIG. 6 is a vertical sectional view taken generally along the line 6—6 of FIG. 5 and in the indicated direction.

In FIGS. 1 and 2 the tractor 20 is shown comprising a chassis or structural framework 22 carrying large rear wheels 24 driven through a conventional power train (not shown) by the prime mover 26 which in this case constitutes a small internal combustion engine mounted forward of the tractor 20. The front wheels 28 are smaller than the rear wheels, being mounted for steering function as controlled by the operator sitting in a seat 30 mounted on the framework 22, through the medium of steering wheel 32 and its associated mechanism. The usual controls, instruments, switches, etc., for operating a tractor of this type are carried on the dashboard 34 under the surveillance and control of the operator.

As best seen in said FIGS. 1 and 2, the operator drives the tractor 20 forward over the ground 36 with the apparatus of the invention including a blade 40 that is inserted into the ground at the rear of the tractor, the blade oscillating back and forth in a vertical plane parallel to the front-to-back axis of the tractor. The oscillation of the blade 40 cuts a thin vertical trench in the ground having a minimum of earth thrown up while doing so, this being indicated by the small ridges 42 of FIG. 1. The blade performs any one of several functions according to its construction. This will be explained hereinafter, but for the present, it may be understood that the blade will pull a pipe or cable through the ground in order to lay the same at the bottom of the blade, or it may lead cable or wire from a reel (not shown) carried on the tractor 20 down through a chute attached to the blade, as will be explained in connection with FIGS. 11 and 12, to cause the cable or wire to be deposited in the bottom of the trench being cut by the blade.

The blade 40 is carried by a housing 44 that is mounted to the chassis 22 of the tractor 20 at the rear end thereof, this housing being swingable between positions that dispose the blade substantially vertically in the ground as shown in FIG. 1 and that carry the blade at an angle and out of the ground as shown in FIG. 2. The operator has controls and the apparatus is constructed to enable the movement of the housing to any of these positions or intermediate positions, without moving from his seat 30. The type of tractor 20 which is preferred is one which has a so-called hydrostatic transmission which gives a smooth transmission of power, but in addition, provides a measure of yielding coupling between the prime mover and the driven elements so that whenever an obstruction is encountered there will be no likelihood of damage to the tractor, the engine, or the cable-laying equipment.

Considering now the details of the apparatus, the housing 44 has a pair of rails 46 that are elongate and somewhat channel-shaped, these rails being connected to extended side formations 48 of the housing 44 and held in place thereon by the bolts 50. The holes 52 in the rails 46 are slotted to enable the rails to be adjusted front and rear, the rails being confined to this movement by guides 54 welded to the plates 48. The forward ends of the rails 46 are provided with eyes as shown at 56, these eyes being engaged upon the stub shafts 58 which, in turn, are welded to the side plates 60 of a boxlike support structure 62 that is secured to the rear of the chassis 22. This boxlike structure 62 is disposed between the rear wheels 24 and extends backward from the tractor 20. The lower end of the housing 44 which comprises side plates 64 is provided with an oppositely protruding shaft 66 welded in place. A pair of cylinders 68 is mounted between the housing 44 and the structure 62, each cylinder 68 having a fixed eye 70 engaged to one of the respective ends of the shaft 66 and held in place by cotter pins 72. The opposite end of each cylinder 68 has an eye 74 that is mounted to the connecting rod 76 and the eye 74 being secured to a pivot pin 78 that, in turn, is secured to the side plate 60, there being two such pins aligned on opposite sides of the structure 62.

Figure 7:
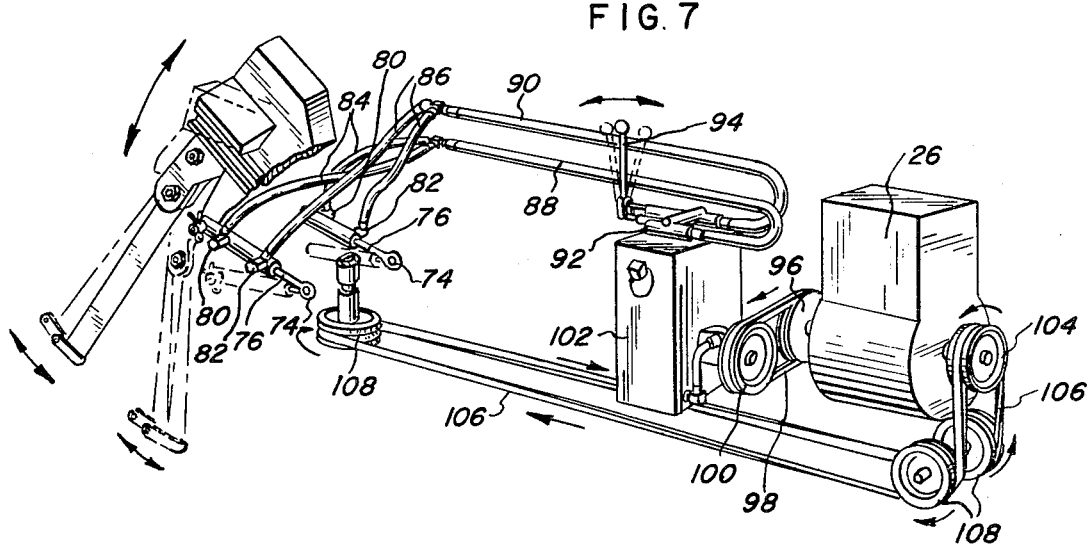
FIG. 7 is a somewhat diagrammatic perspective view showing the mechanical system for driving the blade and the hydraulic system for lifting the blade drive mechanism housing.

Each cylinder 68 is hydraulically operated so that the internal piston thereof may be moved to extend or withdraw the connecting rod 76. This action serves to swing the entire housing 44 with its associated apparatus about the axis of the stub shafts 58 to accomplish the raising or lowering of the blade 40 as previously explained. The broken line position in FIG. 7 is the lowered position. The cylinders each have ports at their front and rear ends as will be evidenced by the fittings 80 and 82. The hydraulic conduits 84 and 86 connect with the two lines 88 and 90 (see FIG. 7) that lead to the valve 92 operated by the hand lever 94 to control the flow of the hydraulic fluid that is pumped by the hydraulic pump driven by the prime mover 26 through a sheave 96, belt 98 and pulley wheel 100. The pump and sump are contained in a suitable housing 102 conveniently mounted to the tractor 20 as shown in FIGS. 1 and 2 so that the lever 94 is readily available to the operator as shown.

The power transfer for the oscillation of the blade 40 is effected as best shown in FIG. 7. From the front of the prime mover 26, power is rotationally taken off by means of a sheave 104 through the medium of a belt 106 that passes over a pair of idler pulleys 108 at the front of the tractor 20. From this point both reaches of the belt, which preferably is of the automotive V-shaped type, pass to the rear of the tractor 20 and around a sheave 108 that is mounted for rotation on a vertical axis of the structure 62. Interior of the structure 62 there is provided a base 110 (FIG. 4) suitably secured to the structure 62 by welding or the like. The sheave 108 is mounted on a vertical shaft 112 that is carried in a bearing 114 secured to this base plate 54. From this bearing 114 the shaft 112 passes into a small gear box 116 and there is connected to a bevel gear 118. The gear box 116 has a side bearing 120 which mounts a stub shaft 124 so that the rotation of the shaft 112 on a vertical axis is converted to rotation of the shaft 122 on a horizontal axis. At the end of the shaft 122 there is secured a sheave 126 and, it will follow the rotation of the sheave 104 will rotate the sheave 126 on a horizontally disposed axis. The sheave 126 carries a V-belt 128 which engages a second sheave 130 that is mounted to a transverse shaft 132 journalled in bearings 134 that are mounted on opposite plates 64.

A sleeve 136 having an eccentrically disposed passageway 138 therein is pinned securely to the shaft 132 so that rotation of the shaft 132 gives an eccentric action to the exterior of the sleeve 136. The exterior of the sleeve 136 is journalled in a large bearing 140 that is mounted in the eye 142 of a connecting rod 144. The opposite end of the connecting rod 144 has an eye 146 journalled on a bearing 148 that, in turn, is mounted to a shaft 150. The shaft 150 is in the form of a sleeve mounted on the body of a bolt 151 that passes through the two arms 152 forming the upper blade holder. At its top end the blade holder is pivoted to a suitable shaft 154 that is mounted between the upper side plates 64 above the junction between the enlarged portions 48. The blade 40 is bolted to the blade holder 152 at 158 and depends therefrom.

From the above discussion, it should be apparent that the mechanism which operates the blade is driven from the shaft 122 through the sheave 126 and its associated V-belt 128. If the entire housing 44 is swung upward to the position shown in FIG. 2, providing that the swinging axis is coincident with the axis of the shaft 122 there will be no effect upon the driven oscillating movement of the blade 40. Accordingly, it would be ideal that the axis of the stub shafts 58 upon which the rails 46 rotate be perfectly coincident with the axis of the shaft 122. Since there is flexibility in the type of V-belts normally used in automotive equipment, there is no need for great accuracy to be exercised in locating the axis of the stub shafts 58 with respect to the axis of the shaft 122. Accordingly, as used in the claims, the expression "substantially coaxial" should be taken to mean approximately coaxial. The greater the coincidence of these axes, the more perfect the operation of the apparatus.

The leading edge 160 of the blade is sharpened to enable it to cut through the ground. At its bottom end, the blade has a foot 162 that is preferably bifurcated and perforated to enable a chain 164 or other flexible member to be secured thereto. A cable or pipe holding device 166 of the so-called "Chinese finger cot" construction is attached to the chain to enable a cable 170, for example, to be secured to the bottom end of the blade 40.

Two other forms of blade are shown in FIGS. 11 and 12. In FIG. 11 the blade 172 has a chute 174 secured thereto, the chute 174 being welded or mounted by the ears 176 to the body of the blade 172. The chute 174 has a top mouth 178 into which a wire or cable 180 may be inserted and it has a passageway 182 throughout its length opening at the bottom at 184 so as to pay out the cable or wire 180 as it is feeding through the chute 174. In the case of such arrangement, the tractor 20 will have a reel of such cable 180 mounted somewhere on the tractor conveniently to unroll and lead the cable down into the chute 174. In FIG. 12 the blade 186 has passageway 188 formed directly in the body of the blade and thus avoiding the need for attaching any member on the outside of the blade as in FIG. 11. The mouth 190 receives the cable or wire 192 at the top and pays it out the bottom.

In the case of the structure of FIG. 9, the cable or pipe 170 has its end secured to the holding device 166 and the blade 40 is started oscillating by the operator with the blade disposed out of the ground as shown in FIG. 2. The oscillating of the blade is produced by the mechanical connections which have been described, and the action of the blade is quite fast although the stroke is very short. The broken and solid line outlines of the blade and carrier of FIG. 3 illustrate the type of oscillation, although as will be seen from a study of the linkage, the movement is somewhat less than might be indicated by FIG. 3. With the blade oscillating, the operator moves the lever 94 in such a direction as to cause the cylinders 68 to lower the blade with its attached cable 170 under the ground as shown in FIG. 1. He may not lower it to the fullest extent to which the mechanism is capable of doing, but in any event, the depth of the blade may be several inches to about a foot below the surface of the ground 36. He will, at this same time, operate the controls which drive the rear wheels 24 and the tractor 20 moves forward. He may readily steer the tractor as it moves. As this occurs, the cable or pipe is drawn forward under the ground, entering at the point where the blade 40 was lowered. The operator drives forward to whatever point he desires and the cable is thus laid under the ground. While the tractor 20 moves forward, the oscillating movement of the blade cuts the necessary trench at the bottom of which the cable will be laid, this cutting being made without the expenditure of excessive power because of the oscillation. Accordingly, a relatively low-powered tractor can be used for the activity.

In the case of the structures of FIGS. 11 and 12, the free end of the cable or wire is led from the reel (not shown) carried by the tractor and threaded through the passageway 182 or 188 so that a substantial portion extends out the bottom of the chute. For this purpose the structures 174 or 186 may have separable members which can be temporarily removed while the cable is placed in the passageway and thereafter replaced. Such constructions are known. Thereafter, the free end of the cable is tied to some form of anchor or large member that will not be pulled into the ground. The blade is in the upper position at this time, and it is started oscillating and lowered into the ground while the tractor is driven forward. As the tractor moves, the blade oscillates and cuts a narrow slit trench while the cable is unreeled and passes into the upper end of the chute and out the bottom end, laying in the bottom of the trench. The cable does not move in such case since it is not being pulled through the ground.

The advantages of using the self-propelled vehicle as described, are believed obvious, but it is clear that there is considerable flexibility of use. The tractor driving mechanism is separate from the mechanism that oscillates the blade so that the tractor may be driven to any desired location without any problem. The mechanism for raising and lowering the blade is independent of the oscillation of the blade so that the blade can be raised or lowered while the oscillation is occurring, thereby enabling the operator to choose any desirable depth without getting out of his seat and without stopping the tractor.

Many other advantages will occur to those skilled in this art from an examination of the foregoing specification. Modifications are readily made in the invention without departing from the spirit or scope thereof as defined in the appended claims.

What it is desired to secure by Letters Patent of the United States is:

1. Cable-burying apparatus, comprising
   A. a self-propelled vehicle adapted to be driven over the ground by a riding operator and having a framework, a prime mover mounted at the front end of the vehicle to the framework for propelling said vehicle,
   B. a housing at the rear of the vehicle and pivotally mounted to the framework for swinging movement in a vertical plane upon a horizontal axis,
   C. a generally vertical blade adapted to enter the ground and being pivotally secured at its upper end to the housing,
   D. a first horizontal shaft carried by the housing and having an eccentric mounted thereon, a connecting rod reciprocating by rotational movement of the eccentric and the rod being connected to the blade between the ends thereof so that reciprocation of the rod will cause the bottom end of the blade to oscillate back and forth in a vertical plane parallel with the front-to-back axis of the vehicle,
   E. power take-off means coupling the prime mover to said first horizontal shaft and including a second horizontal shaft mounted on said framework driven by said prime mover, the axis of said second shaft being substantially coaxial with said horizontal axis,
   F. flexible power transfer means connecting said first and second horizontal shafts, and
   G. means operable by the operator while seated on the vehicle and including extensible link means between said housing and framework to cause the swinging movement of said housing without regard to oscillation of said blade, between a position in which the blade is disposed in the ground and a position in which the blade is tilted up and out of the ground.

2. The apparatus as claimed in claim 1 in which said power take-off means include a vertical shaft carried by said framework at the rear of said vehicle, belt and sheave connections between said prime mover and vertical shaft whereby said shaft rotates while said prime mover is operating, and a mechanical connection between said vertical shaft and said second horizontal shaft for converting vertical rotation of the vertical shaft into horizontal rotation of the said second horizontal shaft.

3. The apparatus as claimed in claim 1 on which the extensible link means comprise at least one hydraulic cylinder having a pivotal connection with said housing at one end thereof and a pivotal connection with the framework at the other end thereof, one of said pivotal connections including a coupling with the connecting rod of the cylinder.

4. The apparatus as claimed in claim 1 in which there are rail means fixed to said housing and extending forwardly therefrom, said rail means having the front end thereof connected to said framework on stub shaft means, the axis of said stub shaft means comprising said horizontal axis.

5. The apparatus as claimed in claim 2 in which said mechanical connection comprises a pair of meshing bevel gears.

6. The apparatus as claimed in claim 1 in which said first and second shafts each have a sheave secured thereto and the flexible power transfer means comprise a flexible belt connected between the sheaves.

7. The apparatus as claimed in claim 1 in which the framework includes a boxlike structure connected to said framework at the rear thereof, the pivotal mounting of said housing is to said boxlike structure and the second horizontal shaft is mounted on said boxlike structure.

8. The apparatus as claimed in claim 7 in which said power take-off means include a vertical shaft carried by said boxlike structure, belt and sheave connections between said prime mover and vertical shaft whereby said shaft rotates while said prime mover is operating, and a mechanical connection between said vertical shaft and said second horizontal shaft for converting vertical rotation of the vertical shaft into horizontal rotation of the said second horizontal shaft.

9. The apparatus as claimed in claim 1 in which said blade has a passageway for leading a cable or the like to the blade to pass down the same and out the bottom of the blade into the bottom of the trench being cut by the blade during oscillation thereof and while the vehicle is moving forward.

10. The apparatus as claimed in claim 1 in which said blade has a connection at the bottom end thereof for coupling a cable or the like to the blade to enable the cable or the like to be pulled forward through the trench being cut by the blade during oscillation thereof and while the vehicle is moving forward.

11. Cable burying apparatus, comprising
    A. a self-propelled vehicle adapted to be driven over the ground by a riding operator and having a framework, a prime mover mounted at the front end of the vehicle to the framework for propelling said vehicle,
    B. a housing at the rear of the vehicle and pivotally mounted to the framework for swinging movement in a vertical plane upon a horizontal axis,
    C. a generally vertical blade adapted to enter the ground and being pivotally secured at its upper end to the housing,
    D. a first horizontal shaft carried by the housing and having an eccentric mounted thereon, a connecting rod reciprocating by rotational movement of the eccentric and the rod being connected to the blade between the ends thereof so that reciprocation of the rod will cause the bottom end of the blade to oscillate back and forth in a vertical plane parallel with the front-to-back axis of the vehicle, E. power take-off means coupling the prime mover to said first horizontal shaft and including means mounted on the framework capable of transmitting rotational movement from said prime mover to said first horizontal shaft for all positions of said housing, and F. means operable by the operator while riding including variable length link means connected between said housing and framework to cause the swinging movement of said housing without regard to oscillation of the blade, between a position in which the blade is disposed in the ground and a position in which the blade is tilted up out of the ground.

12. The apparatus as claimed in claim 11 in which said means capable of transmitting rotational movement include a second horizontal shaft and flexible power transfer means connecting said first and second horizontal shafts.

13. Cable-burying apparatus, comprising a self-propelled vehicle having a framework and being adapted to be driven over the ground by a riding operator, a housing at the rear end of said vehicle, said housing being pivotally mounted to said framework for swinging movement in a vertical plane upon and about a horizontal axis, a generally vertical blade adapted to enter the ground and being pivotally secured at its upper end to said housing, a first horizontal shaft carried by said housing and having an eccentric mounted thereon, a connecting rod which is reciprocated by rotational movement of said eccentric and which is connected to said blade between the ends thereof so that reciprocation of said rod will cause the bottom end of said blade to oscillate back and forth in a vertical plane parallel with the front-to-back axis of said vehicle, a second horizontal shaft mounted on said framework, the axis of said second shaft being substantially coaxial with said horizontal axis, power transfer means operatively connecting said second shaft to said first shaft for driving said first shaft from said second shaft, means for rotating said second shaft, and means operable by the operator while seated on said vehicle for causing swinging movement of said housing without regard to the oscillation of said blade, between a position in which said blade is disposed in the ground and a position in which said blade is tilted up and out of the ground, said means for causing swinging movement including extensible linkage connected between said housing and said framework.

* * * * *